United States Patent
Olsson et al.

(10) Patent No.: US 10,039,154 B2
(45) Date of Patent: Jul. 31, 2018

(54) NODE AND METHOD FOR ESTABLISHING AN INACTIVITY TIMER IN A WIRELESS NETWORK

(71) Applicant: Telefonaktiebolaget LM Ericsson (publ), Stockholm (SE)

(72) Inventors: Lasse Olsson, Stora Höga (SE); John Stenfelt, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/308,721

(22) PCT Filed: May 16, 2014

(86) PCT No.: PCT/EP2014/060144
§ 371 (c)(1),
(2) Date: Nov. 3, 2016

(87) PCT Pub. No.: WO2015/172850
PCT Pub. Date: Nov. 19, 2015

(65) Prior Publication Data
US 2017/0150549 A1    May 25, 2017

(51) Int. Cl.
*H04W 8/18* (2009.01)
*H04W 8/02* (2009.01)
(Continued)

(52) U.S. Cl.
CPC .............. *H04W 76/38* (2018.02); *H04W 8/02* (2013.01); *H04W 8/18* (2013.01); *H04W 64/00* (2013.01); *H04W 76/068* (2013.01)

(58) Field of Classification Search
CPC ......... H04W 52/0222; H04W 52/0235; H04W 76/068
See application file for complete search history.

(56) References Cited

U.S. PATENT DOCUMENTS

2002/0172178 A1    11/2002  Suzuki et al.
2007/0259673 A1*   11/2007  Willars ............. H04W 52/0225
                                                         455/453
(Continued)

FOREIGN PATENT DOCUMENTS

| WO | 2012153211 A1 | 11/2012 |
| WO | 2013053896 A1 | 4/2013 |
| WO | 2014035418 A1 | 3/2014 |

OTHER PUBLICATIONS

Alcatel-Lucent, et al., "S2-133803: Core Network assisted eNB parameters tuning," 3rd Generation Partnership Project (3GPP), SA WG2 Meeting #99, Change Request 23.682, Version 11.5.0, Sep. 23-27, 2013, 3 pages, Xiamen, P.R. China.
(Continued)

*Primary Examiner* — Liton Miah
(74) *Attorney, Agent, or Firm* — Withrow & Terranova, PLLC

(57) ABSTRACT

Example embodiments presented herein are directed towards a policy control node, and corresponding method therein, for determining an inactivity timer for a wireless device. Example embodiments are also directed towards a mobility management node, and corresponding method therein, for determining the inactivity timer for a wireless device. The example embodiments allow inactivity timers to be provided in a dynamic manner based on network conditions.

19 Claims, 8 Drawing Sheets

(51) Int. Cl.
*H04W 64/00* (2009.01)
*H04W 76/38* (2018.01)
*H04W 76/06* (2009.01)

(56) References Cited

U.S. PATENT DOCUMENTS

| | | | |
|---|---|---|---|
| 2008/0130594 A1* | 6/2008 | Suzuki | H04W 76/25 370/338 |
| 2008/0198871 A1 | 8/2008 | Shahidi et al. | |
| 2009/0092091 A1* | 4/2009 | Balasubramanian | H04W 76/38 370/329 |
| 2010/0325306 A1 | 12/2010 | Vimpari et al. | |
| 2013/0044590 A1* | 2/2013 | Lee | H04W 76/38 370/228 |
| 2014/0200015 A1* | 7/2014 | Kweon | H04L 5/0037 455/450 |
| 2014/0293857 A1* | 10/2014 | Dalsgaard | H04W 52/0222 370/311 |

OTHER PUBLICATIONS

Alcatel-Lucent, et al., "S2-133842: Core Network assisted eNodeB parameters tuning," 3rd Generation Jartnership Project (3GPP), SA WG2 Meeting #99, Change Request 23.401, Version 12.0.0, Sep. 23-27, 2013, 18 pages, Xiamen, P.R. China.

Author Unkown, "SACC Congestion Control," SACC Generation 11, Technical Solutions Description, Revision A, Nov. 27, 2013, Ericsson AB, pp. 1-17.

Author Unknown, "Technical Specification Group Services and System Aspects; General Packet Radio Service (GPRS) enhancements for Evolved Universal Terrestrial Radio Access Network (E-UTRAN) access (Release 14)," Technical Specification 23.401, Version 14.1.0, 3GPP Organizational Partners, Sep. 2016, 379 pages.

Author Unknown, "Technical Specification Group Radio Access Network; Evolved Universal Terrestrial Radio Access Network (E-UTRAN); S1 Application Protocol (S1AP) (Release 14)," Technical Specification 36.413, Version 14.0.0, 3GPP Organizational Partners, Sep. 2016, 333 pages.

LG Electronics, et al, "S2-134474: Device trigger recall and replace," 3rd Generation Partnership Project (3GPP), SA WG2 Meeting #100, Change Request 23.682, Version 11.5.0, Nov. 11-15, 2013, 8 pages, San Francisco, USA.

SA WG2, "TD SP-130530: 3 CRs to 23.401, 23.682: MTCe-SDDTE (Rel-12)," 3rd Generation Partnership Project (3GPP), TSG SA Meeting #62, Dec. 9-11, 2013, 1 page, Busan, South Korea.

Author Unknown, "Technical Specification Group Services and System Aspects; Policy and charging control architecture (Release 11)," Technical Specification 23.203, Version 11.13.0, 3GPP Organizational Partners, Mar. 2014, 182 pages.

International Search Report and Written Opinion for International Patent Application No. PCT/EP2014/060144, dated Mar. 9, 2015, 9 pages.

Examination Report for European Patent Application No. 14725138.3, dated May 22, 2018, 6 pages.

* cited by examiner

NODE AND METHOD FOR ESTABLISHING AN INACTIVITY TIMER IN A WIRELESS NETWORK

This application is a 35 U.S.C. § 371 national phase filing of International Application No. PCT/EP2014/060144, filed May 16, 2014, the disclosure of which is incorporated herein by reference in its entirety.

TECHNICAL FIELD

Example embodiments presented herein are directed towards a policy control node and a mobility management node, and corresponding methods therein, for determining an inactivity timer for a wireless device.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In operation, a network may release assigned radio resources of a user equipment based on an inactivity in order to reduce resource usage. User inactivity is a certain time period, defined by the value of a "user inactivity" timer, in which no user plane packets, meaning payload or application level data, are exchanged between the user equipment and network. On the expiration of user inactivity timer, the network releases the radio access specific part of the associated Evolved Packet System (EPS) bearers to save resources in the radio access network and to reduce battery consumption in the user equipment and hence the user equipment is transferred to a state of lower activity where it cannot immediately transfer or receive user plane data, more commonly referred to as Idle mode. Once the user equipment is put in idle mode, the default radio bearer is torn down, for example, there is no Radio Resource Control (RRC) connection once the user enters idle mode. When the user comes out of idle mode, for example, due to traffic, paging, the expiry of timers, etc., the user equipment has to reestablish the RRC connection before the bearers may get reactivated.

SUMMARY

The RAN controls timers for transitions between active and inactive modes of wireless devices connected to the RAN using inactivity timers. Such timers are configurable in Operations and Maintenance systems and are therefore static regardless of a current network situation. When these inactivity timers expire, resources are released in the RAN, which may then be used for a different wireless device. It is of interest to keep the inactivity timers as short as possible to manage resources. However, reestablishing resources is also a resource consuming activity, for example, such reestablishment may require a large amount of paging. Different network situations require different policies for inactivity timers. Thus, at least one example object of the example embodiments presented herein is to dynamically provide inactivity timer in a base station depending on a current network situation resulting in the need of an inactivity timer policy change.

At least one example advantage of such a system is the ability to set inactivity timers to more efficiently use the resources available in the network. The example embodiments presented herein give the RAN the needed information to achieve an improved usage of resources to, for example, be able to support a larger number of users during times of congestion but it will also be possible to reduce the load caused by paging by setting the timer to a higher value. Another example advantage may be a reduced frequency of dropped calls or connections between wireless devices and the RAN. A further example advantage may be that a larger number of wireless devices may be supported during times of heavy traffic.

Thus, some of the example embodiments are directed towards a method, in a policy control node, for determining an inactivity timer for a wireless device. The method comprises identifying an indication of a need for an inactivity timer policy change. The method further comprises determining an inactivity timer policy based on the indication. The method also comprises sending, to a mobility management node serving the wireless device, the inactivity timer policy.

Some of the example embodiments are directed towards a policy control node for determining an inactivity timer policy for a wireless device. The policy control node comprises processing circuitry configured to identify an indication of a need for an inactivity timer policy change. The processing circuitry is further configured to determine the inactivity timer policy based on the indication. Further, the policy control node comprises a transmitter configured to send, to a mobility management node serving the wireless device, the inactivity timer policy.

Some of the example embodiments are directed towards a method, in a mobility management node, for determining an inactivity timer for a wireless device. The method comprises receiving, from a policy control node, an inactivity timer policy. The method further comprises determining an inactivity timer value based on the received inactivity timer policy. The method also comprises sending, to a base station serving the wireless device, the inactivity timer value.

Some of the example embodiments are directed towards a mobility management node for determining an inactivity timer for a wireless device. The mobility management node comprises a receiver configured to receive, from a policy control node, an inactivity timer policy. The mobility management node further comprises processing circuitry configured to determine an inactivity timer value based on the received inactivity timer policy. The mobility management node also comprises a transmitter configured to transmit, to a base station serving the wireless device, the inactivity timer value.

Definitions

3GPP 3rd Generation Partnership Project
ADC Application Detection and Control
AS Application Server
BSC Base Station Controller
CAPEX Capital Expenditures
CCR Credit Control Request
CN Core Network
DPI Deep Packet Inspection
E-UTRAN Evolved Universal Terrestrial Radio Access Network
eAPP Enhanced wireless-related applications
eNB Evolved NodeB
EPC Evolved Packet Core
EPS Evolved Packet System
eRAB EUTRAN Radio Access Bearers
GBR Guaranteed Bit Rate
GERAN GSM Edge Radio Access Network
GGSN Gateway GPRS Support Node
GPRS General Packet Radio Service
GSM Global System for Mobile Communication
HW Hardware
IMEI-SV International Mobile Equipment Identity Software Version
IMSI International Mobile Subscriber Identity
LTE Long Term Evolution
M2M Machine to Machine
MME Mobility Management Entity
O&M Operations and Maintenance
OSS Operational Support Systems
PCRF Policy and Charging Rules Function
PDN Packet Data Network
PGW PDN Gateway
RAB Radio Access Bearer
RAN Radio Area Network
RBS Radio Base Station
RNC Radio Network Controller
RRC Radio Resource Controller
SCS Service Capability Server
SGSN Serving GPRS Support Node
SGW Serving Gateway
SAPC Service Aware Policy Controller
SPR Subscription Profile Repository
TA Tracking Area
TAC Tracking Area Code
TDF Traffic Detection Function
UE User Equipment
UMTS Universal Mobile Telecommunications System
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should further be appreciated that the terms user equipment and wireless device may be used interchangeably throughout the description.

General Overview

Figure 1:
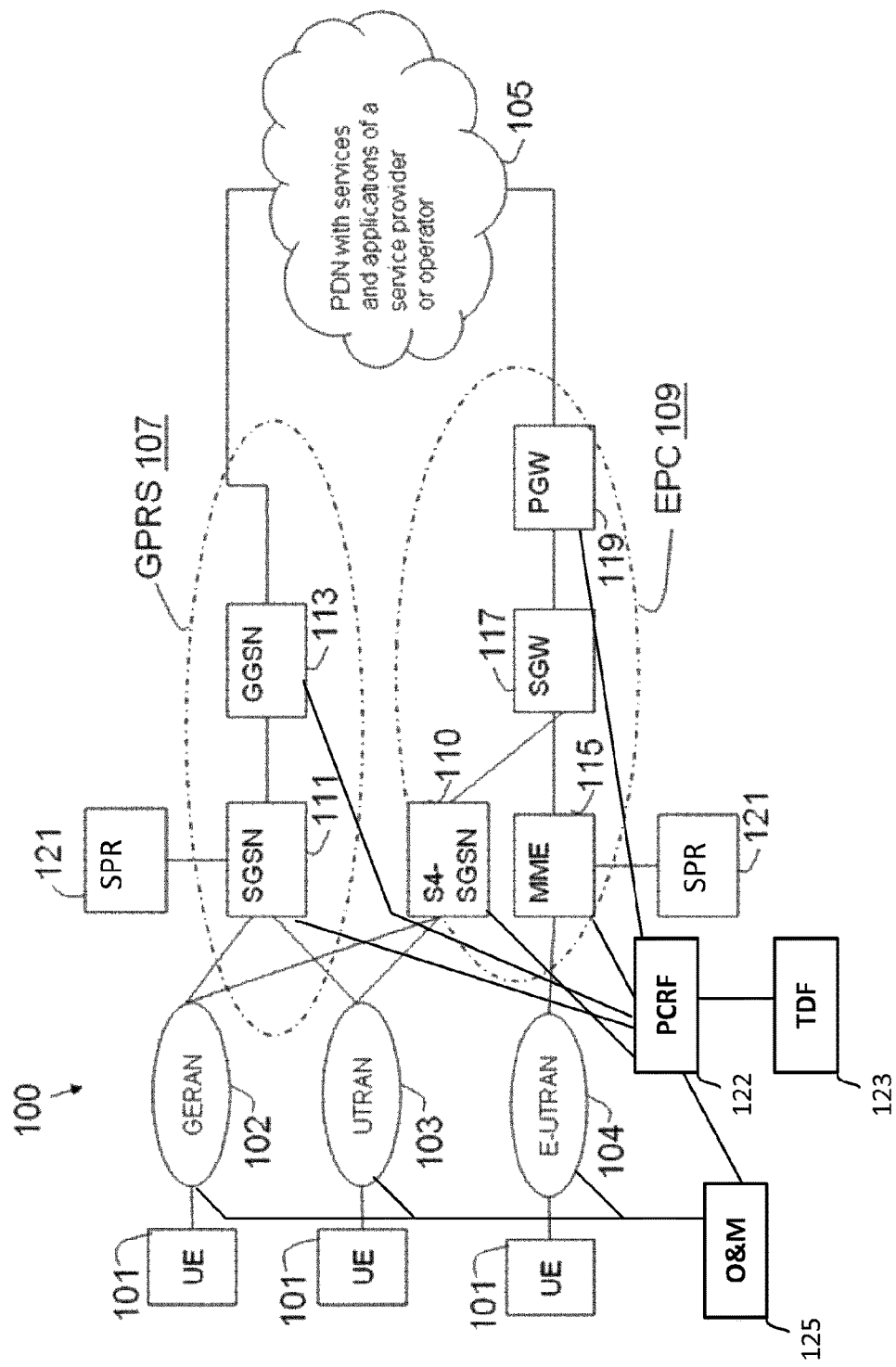
FIG. 1 is an example illustration of a wireless network.

In order to provide a better explanation of the example embodiments presented herein, a problem will first be identified and discussed. FIG. 1 provides a general example of a communication network 100. As shown in FIG. 1, a user equipment (UE) 101 may be in communication with a base station comprised in a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to SCS, AS or hosts 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 comprises a Serving GPRS Support Node (SGSN) 111, which is responsible for the delivery of data packets to and from the mobile stations within an associated geographical service area. The SGSN 111 may also be responsible for packet routing, transfer, mobility management and connectivity management. The GPRS subsystem 107 also comprises a Gateway GPRS Support Node 113, which is responsible for the interworking between the GPRS subsystem 107 and the PDN 105.

The EPC subsystem 109 comprises a Mobility Management Entity 115, which is responsible for mobility management, connectivity management, idle mode UE tracking, paging procedures, attachment and activation procedures, and small data and message transfer. The EPC subsystem also comprises a Serving Gateway (SGW) 117, which is responsible for the routing and forwarding of data packets. The EPC subsystem also comprises a Packet data network Gateway (PGW) 119, which is responsible for providing connectivity from the user equipment 101 to one or more PDN(s) 105. Both the SGSN 111 and the MME 115 may be in communication with a Subscription Profile Repository (SPR) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

The communication network 100 further comprises a Policy and Charging Rules Function (PCRF) 122, which is a node designated to determine policy rules in real time. The communication network 100 may further comprise a Traffic Detection Function (TDF) 123, which is responsible for determining and/or analysing application layer data in the communication network 100. The communications network 100 may also comprise a Operation & Maintenance (O&M) system 125, which is responsible for collecting data regarding the status and configuration of various network nodes such as base stations comprised in UTRAN 103, E-UTRAN 104, or a GERAN 102 subsystem.

When a user equipment or wireless device 101 begins communicating with a base station 102, 103, 104, the wireless device 101 is registered as being active by the base station. Once a wireless device 101 has finished communicating with a base station 102, 103, 104, the base station will begin to register how long the wireless device 101 has been active without communicating. Once sufficient time has passed, the base station 102, 103, 104 will change the status of the wireless device 101 from active to inactive. Once a wireless device 101 has transitioned to an inactive state, radio communications resources reserved for communicating with the wireless device 101 will be released and available for use in communicating with a different wireless device.

The time lapsed from the last communication to the transition from active to inactive is referred to as an inactivity timer. Selecting the duration of the inactivity timer will impact how long radio resources are reserved for a specific wireless device 101. Short inactivity timers of, for example, 5 seconds will allow radio resources to be freed up very quickly and accommodate a larger number of wireless devices for the same physical hardware. However, in order to re-establish a connection, the base station or a mobility management node, for example, MME, SGSN, or S4-SGSN, will need to page for a wireless device. Since the wireless device may have moved since last time of communication the paging must be done in multiple cells which is resource consuming. Re-establishment of a connection also takes some time and therefore introduces a certain delay in the responsiveness of the system. Thus, if the inactivity timer is short, there is a statistical increase in the amount of communication between wireless devices and the radio access network.

Meanwhile, with long inactivity timers of over 60 seconds the amount of radio resources which are reserved for each wireless device is greater. Thus, the base stations 102, 103, 104 will run out of resources faster with the same physical hardware, especially during times when the signaling load is very high, for example, due to a large number of wireless devices attempting to communicate on the network which may occur during peak commuting hours or in heavily populated areas.

Idle/Active transitions in E-UTRAN prior to 3GPP Rel-12 are typically static and determined by a configurable value in the base station. However this is done without any knowledge about the service or application that the wireless device is actually using, a network load status or what terminal type the wireless device is. Thus, network conditions are not taken into account when determining inactivity timers.

Certain terminal types, and certain applications, may be prone to high amounts of signaling causing frequent transitions between the connected and idle mode in LTE. If the Radio Access Network is not aware of the terminal type or the application used by the wireless device, the Radio Access Network may not adjust the inactivity timer values optimally. Inactivity timer values which are too short may lead to increased signaling load towards the CN and also increased paging signaling, which is a problem for the base station as this may affect the entire TA/TA-list in a worst case scenario.

Some operators would like to set a lower inactivity timer value for wireless devices in certain locations during times of expected increased signaling usage in order to quickly free up radio resources when they are not used, for example, changing the timer from 10 s to 5 s. To do adjust the inactivity timer value in an optimal manner it would be useful to know, for example, the terminal type and/or service in use by the wireless device. Since the base station is not aware of this, it cannot optimally adapt of the value of the inactivity timer by itself solely based on, for example, the number of eRABs in a cell. This leads to an unnecessary signaling load on both the RAN and EPC and a sub-optimal user experience in times of congestion.

Overview of the Example Embodiments

As should be appreciated from the above section, there is a need for a solution for providing inactivity timers to the radio access network to improve resource usage, and in such a way that it may dynamically adapt to different conditions. This may be achieved by utilizing a policy control node which has access to information such as, a type of service or application being used by a wireless terminal, a terminal type of the wireless device and/or a RAN congestion status. It should be appreciated that the example embodiments presented herein may be applied to multiple scenarios. Inactivity timer policies selected by policy control node, this implies that any knowledge any knowledge available to the policy control node may be used (e.g. location, congestion information, terminal type and service s used) to select an optimal timer value.

From 3GPP Release 12, it is possible to provision the inactivity timer from a mobility management node, for example a MME, SGSN or S4-SGSN to the base station. The inactivity timer is valid per wireless device. The function is automatically used if the timer is received in the base station but the final decision of which value to use is still within RAN. The general idea of the example embodiments presented herein is to extend this mechanism and to allow for a policy control node, for example, a PCRF to provision the inactivity timer to a mobility management node, for example a MME, SGSN or S4-SGSN, using a direct interface between the policy control node and the mobility management node. The policy control node may decide the inactivity timer differently based on a number of factors that are unknown to the mobility management node, or that would be hard to retrieve information about. According to some of the example embodiments, this may be solved by informing the base station through the mobility management node about the best suited inactivity timer.

The flexibility of providing an inactivity timer value as discussed above is currently not possible via the base station alone, or even if assisted by the mobility management node, as provided for in 3GPP Release 12. From a customer point of view this functionality would provide a countermeasure for E-RAB rejections in network scenarios when large numbers of users are temporarily situated in an area. It also allows for a differentiated inactivity timer setting that may take into account different terminal types and services in use. Since the alternative, for operators who do not want to compromise on quality, is to buy additional HW or licenses the dynamics of the described mechanism should appeal as very cost efficient from an CAPEX perspective.

It should be appreciated that while the example embodiments described herein are directed towards providing an inactivity timer, the example embodiments may be applied to communication functionality which may benefit from dynamic network conditions, for example, communication scheduling.

The remainder of the text is organized as follows. First, an explanation of how the inactivity timer value and information associated in determining the value is explained under the subheading 'Information exchange'. Thereafter, example embodiments for determining the inactivity timer value based on a service or application, a terminal type and a RAN congestion status are discussed under the subheadings 'Service based determination', 'Terminal type based determination', and 'Congestion based determination', respectively. Thereafter, example node configurations of a policy control node and a mobility management node are provided under the subheading 'Example node configurations'. Finally, example operations which may be performed by the policy control node and the mobility management node are provided under the subheading 'Example node operations'.

Information Exchange

Information related to the inactivity timer value, an inactivity timer value policy or in inactivity timer value itself may be provided during the establishment of a connection between the wireless device and the network. The term inactivity timer policy is used herein. It should be appreciated that this may comprise any number of inactivity timer values for a given wireless device profile. According to some of the example embodiments a wireless device profile may be dependent on any number of factors such as, for example, subscription based data, network conditions, etc.

Figure 2:
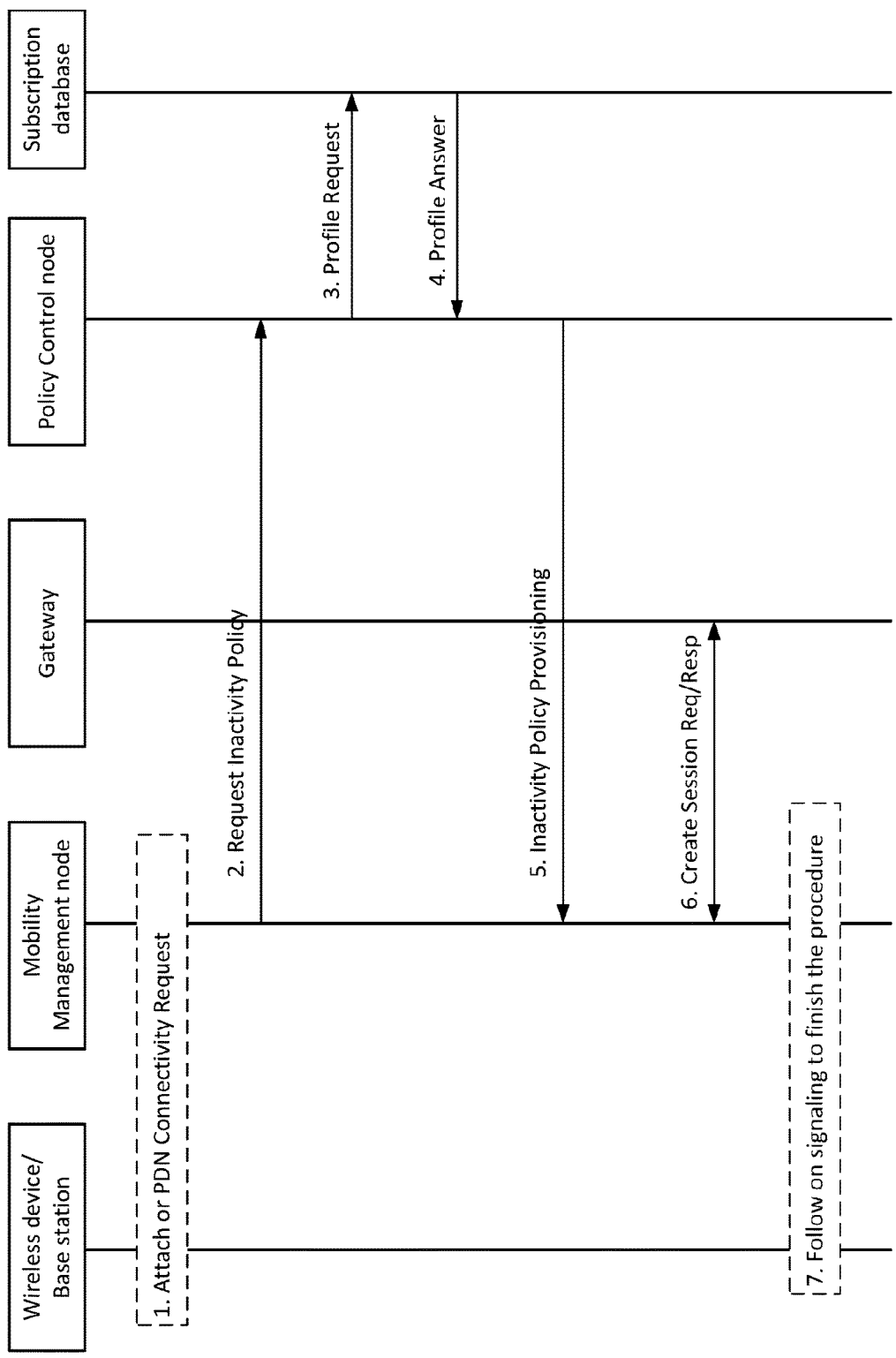
FIG. 2 is an example illustration of a sequence diagram of an attach procedure, according to some of the example embodiments.

FIG. 2 illustrates an example sequence diagram of an attach procedure for creating a session between a wireless device and the network. A base station or a wireless device together with such a base station communicates with a mobility management node for requesting an attach or a PDN connectivity procedure (message 1). It should be appreciated that the mobility management node may be a MME 115, SGSN 111 or a S4-SGSN 110 as illustrated in FIG. 1.

The mobility management node thereafter transmits a request for an inactivity policy to a policy control node (message 2). It should be appreciated that the policy control node may be a PCRF 122 as illustrated in FIG. 1. The request transmitted in message two may serve as an indication to the policy control node that an inactivity timer policy change is needed. In the example provided in FIG. 2, this indication is provided at the attach procedure. The policy control node in turn, requests a profile from a subscription database, for example, the SPR 121 of FIG. 1 (message 3). The subscription database answers the request by sending a profile answer to the policy control node (message 4). The profile answer comprises data regarding subscription specific policies. Such data may comprise any rules or conditions for determining an inactivity timer as provided by an operator. The data comprised in message 4 may also comprise inactivity timer values or policies for different types of applications or services the wireless device may be configured to use. Furthermore, the data of message 4 may comprise an inactivity timer value or policy based on a terminal type of the wireless device. According to some of the example embodiments, the policy control node may also send a request to an O&M or the mobility management node with regard to a current RAN congestion status. The policy control node may provide an inactivity timer or an inactivity timer profile based on the current RAN congestion status.

The policy control node thereafter determines, based on the profile answer from the obtained data, an inactivity timer value or policy to be implemented for the wireless device. The policy control node subsequently transmits an inactivity policy provisioning comprising the determined inactivity timer value or inactivity timer policy to the mobility management node (message 5).

The mobility management node thereafter communicates with the network gateway through a Create Session request and corresponding Create Session response (message 6). The mobility management node then performs follow on signaling with the base station and, through the base station, the wireless device to finish the attach procedure (message 7). Thereafter, the wireless device is connected to the network through a session with the gateway, and is able to send and receive data on the network.

It should be appreciated that the inactivity timer policy may comprise a number of possible inactivity timer values based on any number of factors, for example, a wireless device terminal type, a type of service or application in use, or a RAN congestion status. Thus, if an actual inactivity timer value is not provided in message 5, the mobility management node may determine the inactivity timer value to be applied based on the information provided by the policy control node. This information is provided to the base station and it is the base station which implements the inactivity timer.

Figure 3:
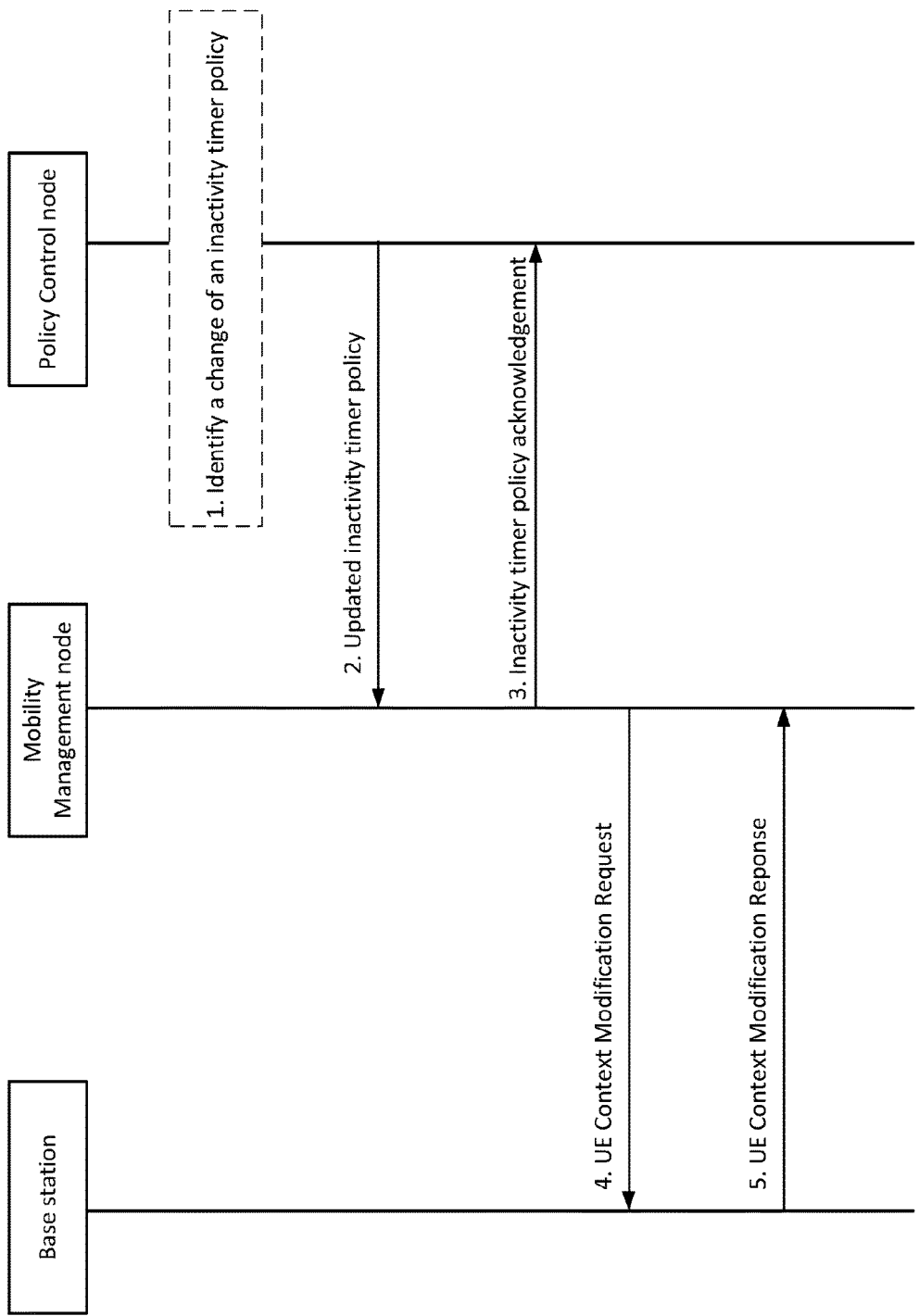
FIG. 3 is an example illustration of a sequence diagram of a dynamic inactivity policy change, according to some of the example embodiments.

According to some of the example embodiments, the inactivity timer may also be adjusted dynamically based on any number of current conditions. FIG. 3 illustrates an example sequence diagram of a dynamic inactivity timer update according to some example embodiments. First, the policy control node of a network identifies an indication of a need for an inactivity timer policy change. Such an indication may comprise, for example, a detected use of an application or service. Such detection may be provided via a TDF 123 as illustrated in FIG. 1. The indication may also be based on subscription information. For example, based on a current time and/or location, the need for the change in the inactivity timer policy may be detected. Furthermore, such an indication may be in the form of a RAN congestion status. The policy control node may obtain such information from the mobility management node and/or the O&M node.

Once the policy control node identifies the need to change the inactivity timer policy, the policy control node transmits an updated inactivity timer policy, or the inactivity timer value itself, to the mobility management node of the network (message 2). The mobility management node receives the updated inactivity timer policy and transmits an inactivity timer policy acknowledgement acknowledging that the inactivity timer policy has been received (message 3).

If the information provided by the policy control node does not comprise the value of the inactivity time, the mobility management node will determine the value of the inactivity timer based on the policy received from the policy control node. The mobility management node thereafter transmits to the base station serving the wireless device a UE context modification request featuring the inactivity timer value (message 4). The base station responds to the mobility management node with a UE context modification response, indicating the outcome of the request (message 5).

Service Based Determination

According to some of the example embodiments, the policy control node may utilize information regarding a type of service or application the wireless device is using in order to determine the inactivity timer value or policy. According to some of the example embodiments, with information about which service or application the wireless device is using, it is possible to construct a table within the PCRF that holds the best suited RAN inactivity timer value per application.

The detection of the service or application in use may for example be provided through so called Deep Packet Inspection (DPI). Application Detection and Control (ADC) has been in 3GPP standards since 3GPP Release 11 (ref 23.203) and provides a mean for notifying the PCRF from a PGW/GGSN or a Traffic Detection Function (TDF) over Gx or Sd interfaces, which services that has been detected through DPI. If a particular service or application is expected to engage in frequent communications with data packets, it may be desirable to keep the inactivity timer value low to reduce the waste of radio resources. If a particular service or application is expected to utilize a smaller amount of signaling or system resources, it may be desirable to keep the inactivity timer value high to reduce the need to paging and core network signaling.

In operation, the policy control node may identify a need for an inactivity timer policy change based on an attach procedure, as discussed in FIG. 2, or dynamically as shown in FIG. 3. According to some of the example embodiments, dynamic changes to an inactivity timer policy based on a service or application used by may be identified or indicated by user (e.g., wireless device) location information. Non-limiting examples of such user location information may be, for example, a current tracking area, tracking area list or cell identification.

Terminal Based Determination

According to some of the example embodiments, the policy control node may utilize information regarding a terminal type of the wireless device in order to determine the inactivity timer value or inactivity timer policy. The policy control node may have optimal inactivity timer settings per terminal type. Non-limiting examples of different terminal types comprise stationary M2M sensors, feature phone model X, Smartphone model X, etc. A terminal type in combination with a type of service used by the wireless device may also be used in combination, for example, a smart phone model X being the terminal type and the application being Facebook. The more prone a particular terminal type is to increased signaling, the more likely a shorter inactivity timer value may be preferred.

IMEI-SV, that defines terminal type and is already today provided to the policy control node over Gx in 3GPP standards during the attach procedure. According to some of the example embodiments, the transfer of the terminal type from the mobility management node to the policy control node is performed over a direct interface. According to some of the example embodiments, the TAC or the complete IMEI(sv) may be to be used.

In operation, the policy control node may identify a need for an inactivity timer policy change based on an attach procedure, as discussed in FIG. 2, or dynamically as shown in FIG. 3. According to some of the example embodiments, dynamic changes to an inactivity timer policy based on a terminal type may be identified or indicated by a type of service or application being utilized by the wireless device.

Congestion Based Determination

According to some of the example embodiments, the policy control node may utilize information regarding a current RAN load or congestion status in order to determine the inactivity timer value or an inactivity timer policy. The RAN load or congestion status may be based on historical data. The historical congestion information may be provided to the policy control node via, for example, the mobility management node and/or an O&M node. According to some of the example embodiments, the policy control node may be configured to periodically monitor the O&M and/or the mobility management node to update the RAN congestion status. Alternatively, the mobility management node and/or the O&M node may be configured to provide the policy control node an updated congestion status in a periodic manner or when a change in congestion status has been detected. The policy control node will identify the need to update the inactivity timer policy based on the RAN congestion status.

During times of high activity/high usage it may be favorable to set inactivity timers lower than normal for wireless devices in congested cells in order to release RAN resources as quickly as possible thereby accounting for highest possible number of users per cell during times of high load/congestion.

In E-UTRAN, the number of E-RABs that may be admitted by an eNodeB is limited either by hardware or license. Thus, when an eNodeB reaches its maximum number of acceptable E-RABs, the eNodeB's bearer admission control will start to reject additional E-RAB requests from the MME until the number of admitted E-RABs has decreased to an acceptable level. It should be mentioned that this is done regardless of if the radio interface is fully utilized or not, for example, there may very well be radio resources left, but the number of E-RABs is too high. Thus, in a scenario when wireless device density is high in an area it is beneficial to release E-RABs as soon as they become inactive.

As an example, assume that only stationary smartphone LTE-users in an area. The users make on average 25 service requests per busy hour, i.e., the most traffic intense hour of the day, and assume that the applications they use are engaged in frequent communications and transmit the non-GBR data that they need to send in exactly 2 seconds. This implies that the E-RAB used for transmitting the data will be occupied for a duration of 2 seconds plus the value set for the inactivity timer. For reasons of simplicity, it is assumed that the service requests occur according to a Poisson arrival process. Furthermore, it is assumed that the maximum number of acceptable E-RABs, via HW or license, in a cell is X and that the total number of smartphone users in an LTE-area is finite. The E-RAB block probability is thus defined as the probability that an incoming service request occurs when there is already X number of E-RABs accepted in a cell.

Figure 4:
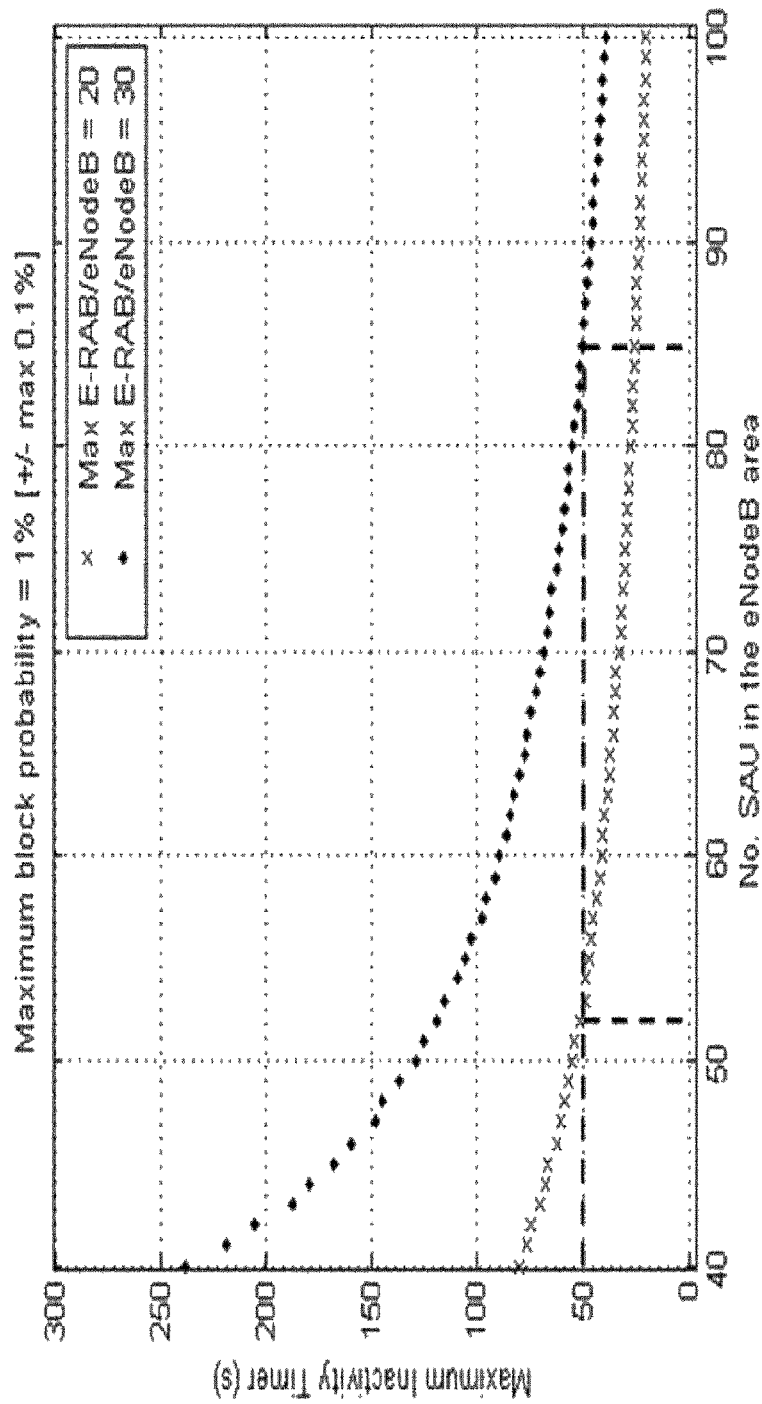
FIG. 4 is a graphical example of the determination of a maximum inactivity timer based on RAN congestion, according to some of the example embodiments.

FIG. 4 illustrates simulation results for the specific system described above. Two simulations are provided where the maximum number of acceptable E-RABs, i.e., X, is 20 and 30 respectively. The simulations show the maximum inactivity timer value that may be set in order not to surpass an E-RAB block probability of 1% depending on the Simultaneous number of Attached Users (SAU), i.e., the number of smartphone LTE-users, in the cell area.

As can be seen from FIG. 4, as the number of SAU in an area increases, the inactivity timer may be reduced to maintain the target blocking probability. Therefore, by controlling the inactivity timer setting from the policy control node based on network load, and potentially location, and sending this to the mobility management node and further on to the base station, it is possible to assure that the timer is within a suitable interval to provide good QoS. All of this could potentially be done locally within the mobility management node, however that would require the mobility management node to obtain, or learn, the load status from the base station, or from the OSS. More importantly, the policy control node probably wants to bias the setting based on other policies, for example, terminal type, service in use, etc., that are unknown to the mobility management node.

For the example provided in FIG. 4, when comparing between X=20 (licenses) and X=30 it may be seen that with a maximum of 20 E-RABs per eNodeB and an inactivity timer set to 50 seconds the target E-RAB block error probability (1%) may be maintained for up to 52 SAU in the area. However, this specific operator would have to increase the number of licenses, or expand the NW, to 30 E-RABs per base station to account for a peak (BH) of 85 SAU in the area, or alternatively to manually re-configure the timer settings in this area which would affect CAPEX. This corresponds to a 50% increase in base station licenses, or HW, that would not have been needed if the policy control node would have been able to dynamically adjust the inactivity timers based on, for example, a RAN historical load during times of busy hour. By adjusting the timer settings to 25 seconds during busy hour, a target E-RAB block error ratio of 1% can still be maintained for 85 SAU even with X=20 (licenses).

Example Node Configurations

Figure 5:
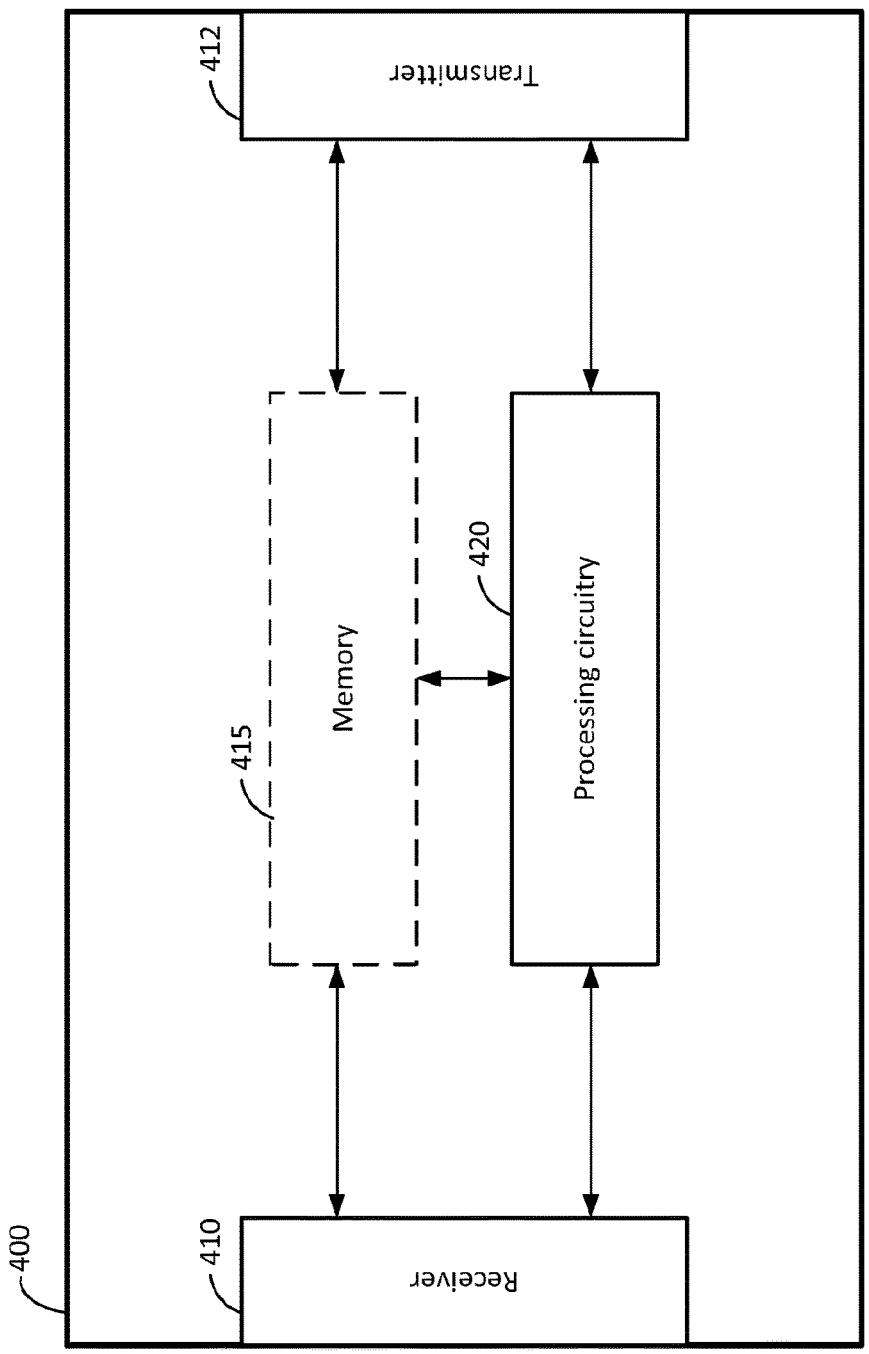
FIG. 5 an illustration example configuration of a policy control node, according to some of the example embodiments.

FIG. 5 illustrates an example node configuration of a policy control node 400. It should be appreciated that the policy control node 400 may be a PCRF 122 or SAPC. The policy control node 400 may perform some of the example embodiments described herein. The policy control node may comprise radio circuitry or any number of communication ports that may be configured to receive and/or transmit communication data, instructions, and/or messages. Specifically, the policy control node 400 may comprise a receiver or receiver module 410 and a transmitter or transmitter module 412. It should be appreciated that the radio circuitry, communication port, receiver and/or transmitter may be comprised as any number of transceiving, receiving, and/or transmitting units or circuitry. It should further be appreciated that such elements may be in the form of any input or output communications port known in the art.

The policy control node 400 may also comprise a processing unit or circuitry 420 which may be configured to provide and retrieve any form of policy information as discussed herein. The processing circuitry 420 may be any suitable type of computation unit, for example, a microprocessor, digital signal processor (DSP), field programmable gate array (FPGA), or application specific integrated circuit (ASIC), or any other form of circuitry. The processing circuitry 420 may also be in the form of a module. The policy control node 400 may further comprise a memory unit or circuitry 415 which may be any suitable type of computer readable memory and may be of volatile and/or non-volatile type. The memory 415 may be configured to store received, transmitted, and/or measured data, device parameters, communication priorities, policy profiles and/or executable program instructions.

Figure 6:
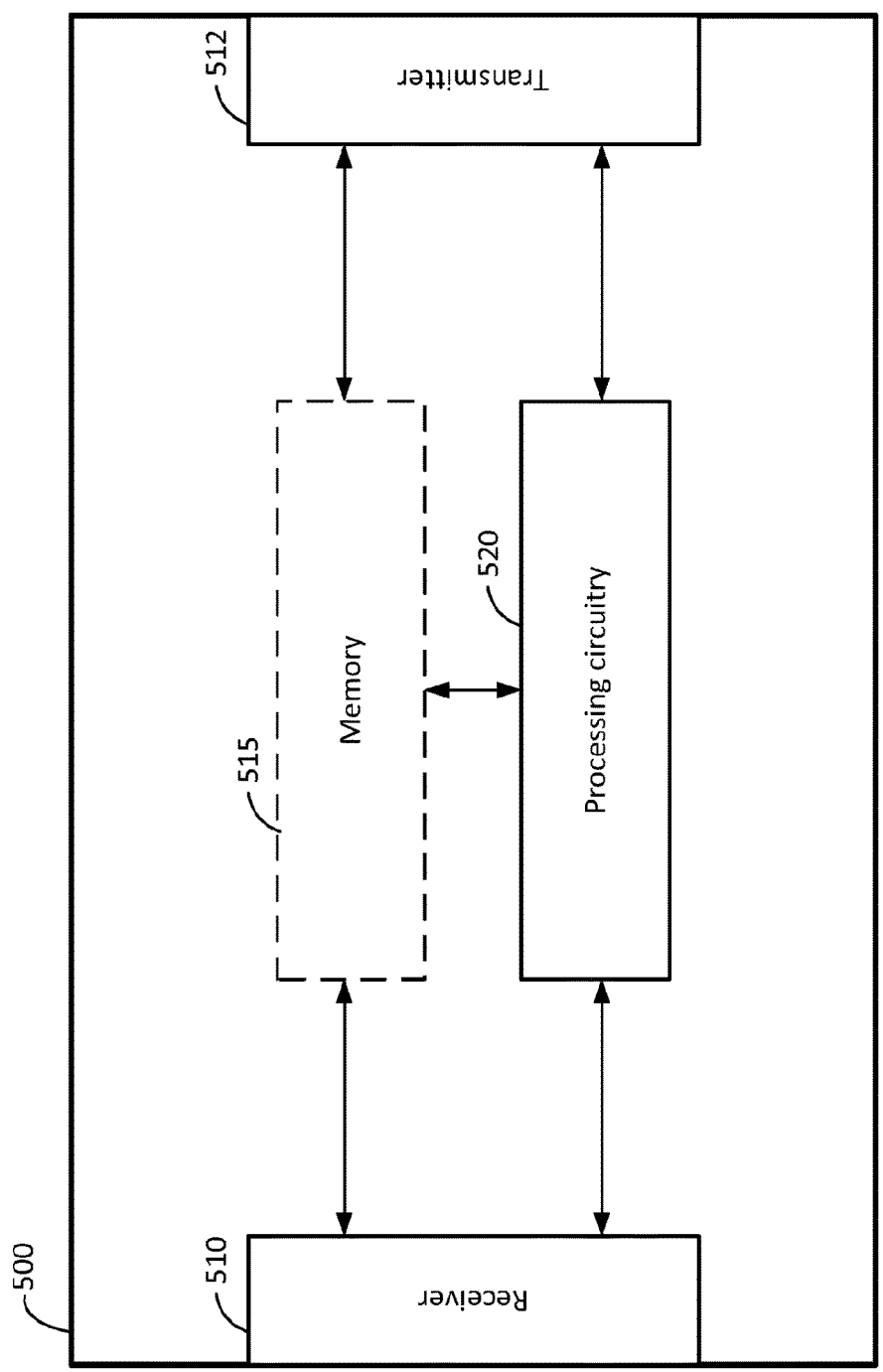
FIG. 6 is an illustration of an example configuration of a mobility management node, according to some of the example embodiments.

FIG. 6 illustrates an example node configuration of a mobility management node 500. It should be appreciated that the mobility management node 500 may be a MME 115, a SGSN 111 or a S4-SGSN 110. The mobility management node 500 may perform some of the example embodiments described herein. The mobility management node 500 may comprise radio circuitry or any number of communication ports that may be configured to receive and/or transmit communication data, instructions, and/or messages. Specifically, the mobility management node 500 may comprise a receiver or receiver module 510 and a transmitter or transmitter module 512. It should be appreciated that the radio circuitry, communication port, receiver and/or transmitter may be comprised as any number of transceiving, receiving, and/or transmitting units or circuitry. It should further be appreciated that such elements may be in the form of any input or output communications port known in the art.

The mobility management node 500 may also comprise a processing unit or circuitry 520 which may be configured to provide and retrieve any form of policy information as discussed herein. The processing circuitry 520 may be any suitable type of computation unit, for example, a microprocessor, digital signal processor (DSP), field programmable gate array (FPGA), or application specific integrated circuit (ASIC), or any other form of circuitry. The processing circuitry 520 may also be in the form of a module. The mobility management node 500 may further comprise a memory unit or circuitry 515 which may be any suitable type of computer readable memory and may be of volatile and/or non-volatile type. The memory 515 may be configured to store received, transmitted, and/or measured data, device parameters, communication priorities, policy profiles and/or executable program instructions.

Example Node Operations

Figure 7:
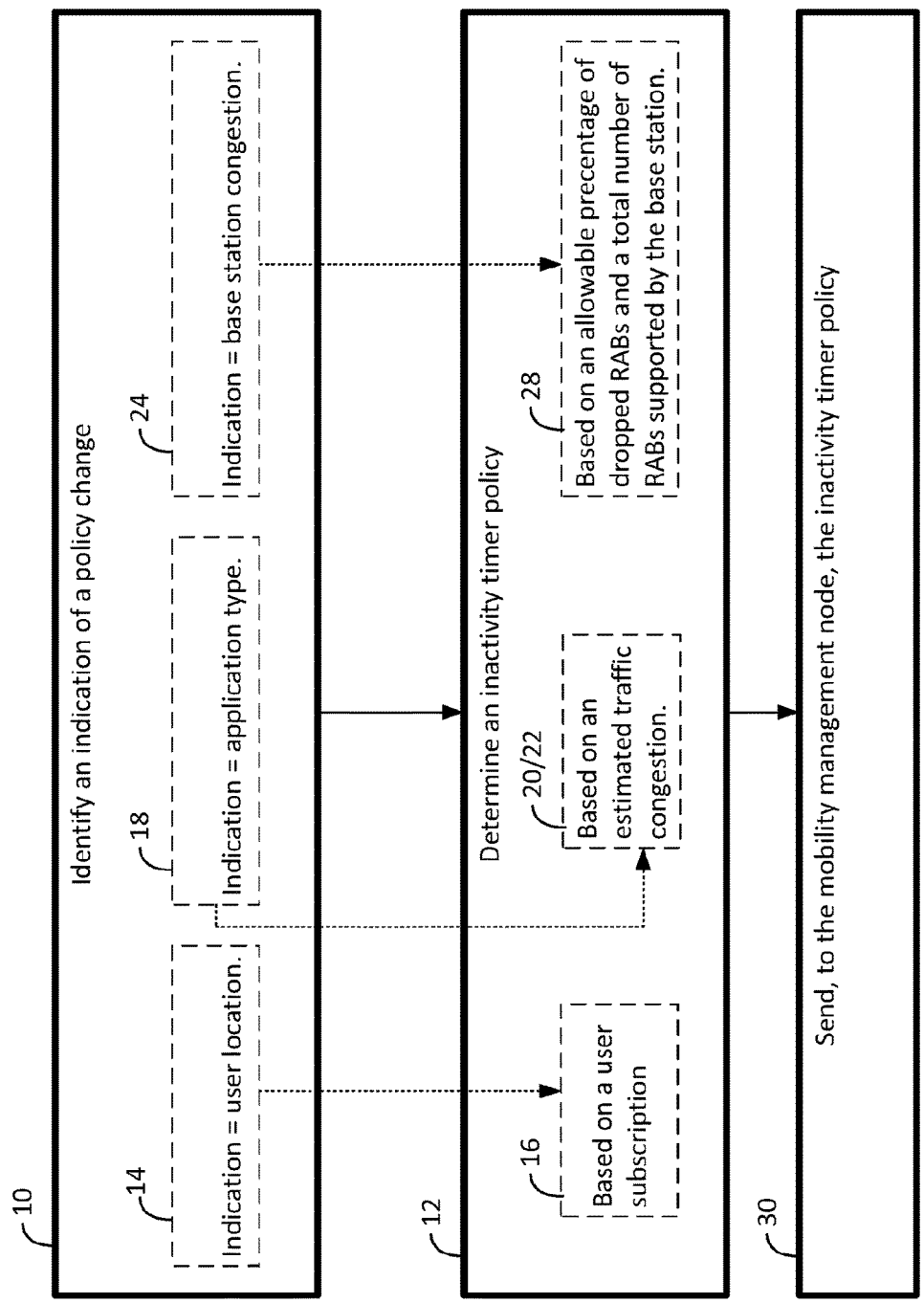
FIG. 7 is a flow diagram of example operations which may be taken by the policy control node of FIG. 4, according to some of the example embodiments.

FIG. 7 is a flow diagram depicting example operations which may be taken by the policy control node 400 in determining an inactivity timer for a wireless device. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The policy control node 400 is configured to identify 10 an indication of a need for an inactivity timer policy change. The processing circuitry 420 is configured to identify the indication of the need for the inactivity timer policy change.

Operation 10 is further described under at least the subheading 'Information exchange'. According to some of the example embodiments, the identifying 10 may occur during an establishment of a PDN connection, as illustrated in FIG. 2, and/or dynamically while the PDN connection is intact, as illustrated in FIG. 3.

Operation 12

The policy control node 400 is configured to determine 12 an inactivity timer policy based on the indication. The processing circuitry 420 is configured to determine the inactivity timer policy based on the indication.

Operation 12 is further described under at least the subheadings 'Service based determination', 'Terminal based determination' and 'Congestion based determination'. It should be appreciated that any other form of information which may affect network signaling usage or congestion may also be utilized as an indication or for the determination of the inactivity timer policy. Furthermore, it should be appreciated that the inactivity timer policy may be the actual value of the inactivity timer and/or an indication of a policy profile associated with the value.

Example Operation 14

According to some of the example embodiments, the identifying 10 may further comprise receiving 14, from the mobility management node 500, the indication, wherein the indication comprises information regarding a current user location. The receiver 410 of the policy control node 400 may be configured to receive, from the mobility management node 500, the indication. Example operation 14 is further described under at least the subheading 'Subscription based determination'. Non-limiting examples of information regarding a current user location are a tracking area, a tracking area list, or a cell identification.

Example Operation 16

According to some of the example embodiments, where the indication comprises information regarding a current user location, the determining 12 may further comprise determining 16 the inactivity timer policy based on a user subscription of the wireless device and a current time, date and/or location of the wireless device. The processing circuitry 420 may be further configured to determine the inactivity timer policy based on a user subscription of the wireless device 101 and a current time, date and/or location of the wireless device. Data regarding the user subscription may be comprised in the subscription database and transmitted to the policy control node 400, for example, with the profile answer transmitted as a response to the profile request from the policy control node, as shown in FIG. 2. Example operation 16 is further described under at least the subheading 'Subscription based determination'.

Example Operation 18

According to some of the example embodiments, the identifying 10 may further comprise receiving 18 from a gateway node 113, 119 or a TDF node 123, the indication, where the indication is a type of application being utilized by the wireless device. The receiver 410 of the policy control node 400 may further be configured to receive, from a gateway node 113, 119 or a TDF node 123, the indication. In this case the indication is a type of application being used by the wireless device 101. Example operation 18 is further described under at least the subheading 'Service based determination'.

Example Operation 20

According to some of the example embodiments, where the indication is a type of application being utilized by the wireless device, the determining 12 may further comprise determining 20 the inactivity timer policy based on, at least, an estimated traffic characteristics of the type of application utilized by the wireless device 101. The processing circuitry 420 may be further configured to determine the inactivity timer policy based on, at least, an estimated traffic characteristic of the type of application used by the wireless device 101. Example operation 20 is further described under at least the subheading 'Service based determination'.

Example Operation 22

According to some of the example embodiments, the determining 20 may further comprise determining 22 the inactivity timer policy based additionally on an estimated traffic characteristics of a device type of the wireless device. The processing circuitry 420 may be further configured to determine the inactivity timer policy based additionally on an estimated traffic characteristic of a device type of the wireless device 101. Example operation 22 is further described under at least the subheading 'Terminal based determination'.

Example Operation 24

According to some of the example embodiments, the identifying 10 may further comprise receiving 24, from the mobility management node 500 or an O&M node 125, the indication. In this case the indication a resource availability status of a base station 102, 103, 104 serving the wireless device 101. The receiver 410 of the policy control node 400 may be further configured to receive, from the mobility management node 500 or an O&M node 125, the indication. Example operation 24 is further described under at least the subheading 'Congestion based determination'.

Example Operation 28

According to some of the example embodiments, wherein the indication is a resource availability status of a base station 102, 103, 104 serving the wireless device 101, the determining 12 may further comprise determining 28 the inactivity timer policy based on an allowable percentage of dropped radio access bearers and a total number of radio access bearers supported by the base station 102, 103, 104. The processing circuitry 420 may be further configured to determine the inactivity timer policy based on an allowable percentage of dropped radio access bearers and a total number of radio access bearers supported by the base station 102, 103, 104. Example operation 28 is further described under at least the subheading 'Congestion based determination'.

Operation 30

The policy control node 400 is configured to send 30, to a mobility management node 500, the inactivity timer policy. The transmitter 412 is configured to send, to a mobility management node 500 serving the wireless device 101, the inactivity timer policy. Operation 30 is further discussed under at least the subheading 'Information exchange'.

Figure 8:
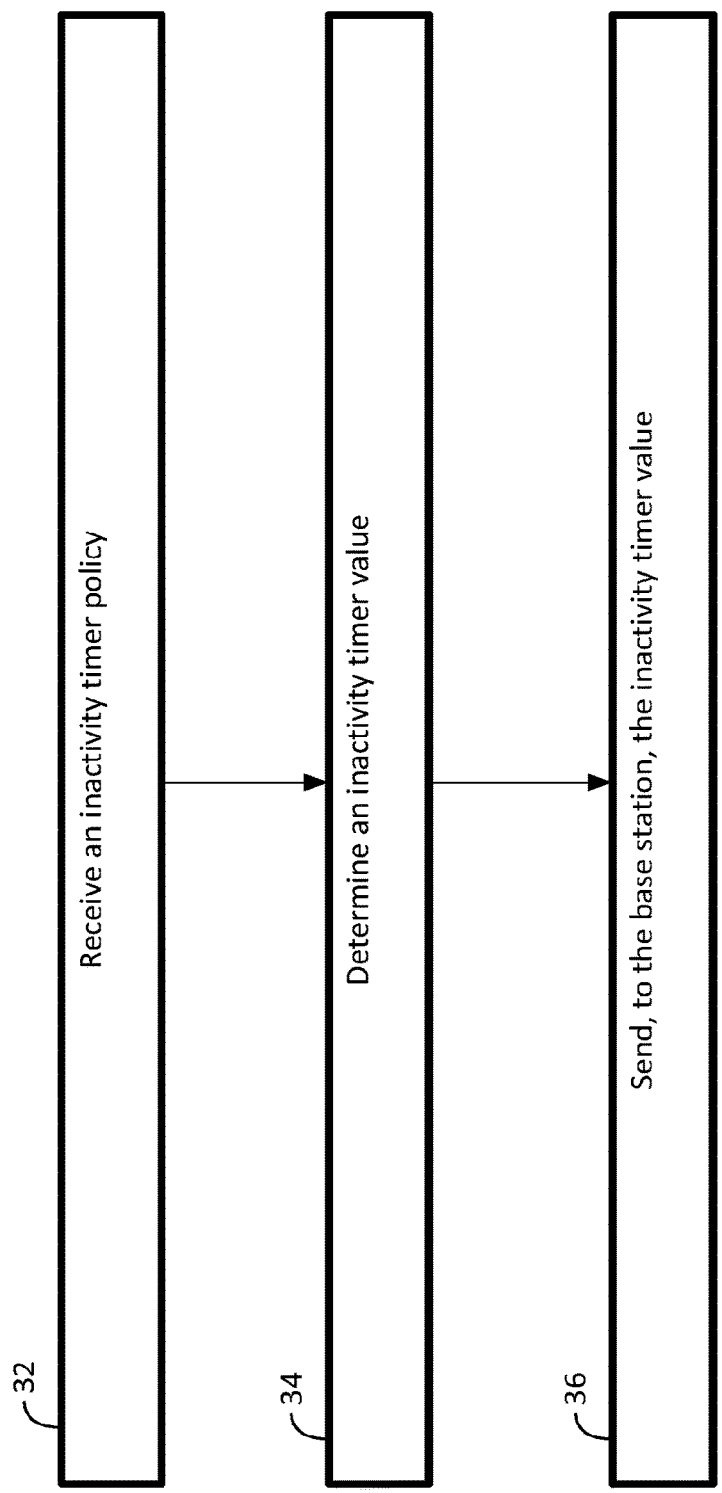
FIG. 8 is a flow diagram of example operations which may be taken by the mobility management node of FIG. 5, according to some of the example embodiments.

FIG. 8 is a flow diagram depicting example operations which may be taken by the mobility management node 500 for determining an inactivity timer for a wireless device 101. It should be appreciated that not all of the operations need to be performed. The example operations may be performed in any order and in any combination.

Operation 32

The mobility management node 500 is configured to receive 32, from a policy control node 400, an inactivity timer policy. The receiver 510 is configured to receive, from the policy control node 400, the inactivity timer policy.

Operation 34

The mobility management node 500 is further configured to determine 34 an inactivity timer value based on an inactivity timer policy. The processing circuitry 520 is configured to determine an inactivity timer value based on the received inactivity timer policy.

Operation 36

The mobility management node 500 is also configured to send 36, to a base station 102, 103, 104 serving the wireless device 101, the inactivity timer value. The transmitter 512 is configured to transmit, to a base station 102, 103, 104 serving the wireless device 101, the inactivity timer value.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a policy control node, for determining an inactivity timer for a wireless device, the method comprising:
    identifying an indication of a need for an inactivity timer policy change during an establishment of a Packet Data Network, PDN, connection and/or dynamically while the PDN connection is intact;
    determining an inactivity timer policy based on the indication and based on at least one of the group consisting of:
        a user subscription of the wireless device and a current time, date and/or location of the wireless device;
        an estimated traffic characteristic of a type of application utilized by the wireless device;
        an estimated traffic characteristic of a device type of the wireless device; and
        an allowable percentage of dropped radio access bearers and a total number of radio access bearers supported by a base station serving the wireless device; and
    sending, to a mobility management node serving the wireless device, the inactivity timer policy.

2. The method of claim 1, wherein the identifying further comprises receiving, from the mobility management node, the indication, wherein the indication comprises information regarding a current user location.

3. The method of claim 2, wherein the determining further comprises determining the inactivity timer policy based on the user subscription of the wireless device and the current time, date and/or location of the wireless device.

4. The method of claim 1, wherein the identifying further comprises receiving, from a gateway node or a Traffic Detection Function, TDF, node, the indication, wherein the indication comprises a type of application being utilized by the wireless device.

5. The method of claim 4, wherein the determining further comprises determining the inactivity timer policy based on, at least, the estimated traffic characteristics of the type of application utilized by the wireless device.

6. The method of claim 5, wherein the determining further comprises determining the inactivity timer policy based additionally on the estimated traffic characteristics of a device type of the wireless device.

7. The method of claim 1, wherein the identifying further comprises receiving, from the mobility management node or an operations and maintenance node, the indication, wherein the indication comprises a resource availability status of a base station serving the wireless device.

8. The method of claim 7, wherein the determining further comprises determining the inactivity timer policy based on the allowable percentage of dropped radio access bearers and a total number of radio access bearers supported by the base station.

9. The method of claim 1, wherein the inactivity timer policy is a value of the inactivity timer and/or an indication of a policy profile associated with the value.

10. A policy control node for determining an inactivity timer policy for a wireless device, the policy control node comprising:
 processing circuitry configured to identify an indication of a need for an inactivity timer policy change during an establishment of a Packet Data Network, PDN, connection and/or dynamically while the PDN connection is intact;
 the processing circuitry further configured to determine the inactivity timer policy based on the indication and based on at least one of the group consisting of:
  a user subscription of the wireless device and a current time, date and/or location of the wireless device;
  an estimated traffic characteristic of a type of application utilized by the wireless device;
  an estimated traffic characteristic of a device type of the wireless device; and
  an allowable percentage of dropped radio access bearers and a total number of radio access bearers supported by a base station serving the wireless device; and
 a transmitter configured to send, to a mobility management node serving the wireless device, the inactivity timer policy.

11. The policy control node of claim 10, further comprising a receiver configured to receive, from the mobility management node, the indication, wherein the indication comprises information regarding a current user location.

12. The policy control node of claim 11, wherein the processing circuitry is further configured to determine the inactivity timer policy based on the user subscription of the wireless device and a current time, date and/or location of the wireless device.

13. The policy control node of claim 10, further comprising a receiver configured to receive, from a gateway node or a Traffic Detection Function, TDF, node, the indication, wherein the indication comprises a type of application being utilized by the wireless device.

14. The policy control node of claim 13, wherein the processing circuitry is further configured to determine the inactivity timer policy based on, at least, the estimated traffic characteristic of the type of application utilized by the wireless device.

15. The policy control node of claim 14 wherein the processing circuitry is further configured to determine the inactivity timer policy based additionally on the estimated traffic characteristic of a device type of the wireless device.

16. The policy control node of claim 10, further comprising a receiver configured to receive, from the mobility management node or an operations and maintenance node, the indication, wherein the indication comprises a resource availability status of a base station serving the wireless device.

17. The policy control node of claim 16, wherein the wherein the processing circuitry is further configured to determine the inactivity timer policy based on the allowable percentage of dropped radio access bearers and a total number of radio access bearers supported by the base station.

18. The policy control node of claim 10, wherein the inactivity timer policy is a value of the inactivity timer and/or an indication of a policy profile associated with the value.

19. The policy control node of claim 10, wherein the policy control node is a Policy and Charging Rules Function, PCRF or a Software Aware Policy Controller, SAPC.

* * * * *